US011963471B2

(12) United States Patent
Harvey et al.

(10) Patent No.: US 11,963,471 B2
(45) Date of Patent: Apr. 23, 2024

(54) STAND-ON OUTDOOR POWER EQUIPMENT FOR AERATING SOIL

(71) Applicant: Briggs & Stratton, LLC, Wauwatosa, WI (US)

(72) Inventors: Kyle Harvey, West Allis, WI (US); Thomas Burkard, Hartland, WI (US); Peter Lucier, Milwaukee, WI (US); Stephen Longmeyer, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/195,228

(22) Filed: May 9, 2023

(65) Prior Publication Data

US 2023/0270037 A1 Aug. 31, 2023

Related U.S. Application Data

(63) Continuation of application No. 16/797,917, filed on Feb. 21, 2020, now Pat. No. 11,665,988.

(60) Provisional application No. 62/808,893, filed on Feb. 22, 2019.

(51) Int. Cl.
*A01B 45/02* (2006.01)
*A01B 75/00* (2006.01)

(52) U.S. Cl.
CPC .......... *A01B 45/026* (2013.01); *A01B 45/023* (2013.01); *A01B 75/00* (2013.01)

(58) Field of Classification Search
CPC ...... A01B 45/023; A01B 45/026; A01B 75/00
See application file for complete search history.

(56) References Cited

U.S. PATENT DOCUMENTS

| 4,424,868 | A | 1/1984 | Staniforth et al. |
| 4,867,244 | A | 9/1989 | Cozine et al. |
| 5,398,769 | A | 3/1995 | Staples |
| 6,637,760 | B1 | 10/2003 | Carman |
| 6,666,280 | B1 * | 12/2003 | Wright ................. A01B 49/027 172/454 |
| 7,743,840 | B2 | 6/2010 | Hoffman |
| 8,291,991 | B1 | 10/2012 | Cook |
| 8,459,371 | B2 | 6/2013 | Hoffman |
| 8,733,477 | B1 | 5/2014 | Cook |
| 9,769,972 | B2 | 9/2017 | Jelks |
| 9,883,629 | B2 | 2/2018 | Smith et al. |
| 10,206,321 | B2 | 2/2019 | Georgoulias et al. |
| 10,362,722 | B2 | 7/2019 | De Bree |
| 10,779,455 | B1 | 9/2020 | Cook et al. |
| 10,842,065 | B1 | 11/2020 | Pascal |
| 11,272,652 | B2 | 3/2022 | King et al. |

(Continued)

FOREIGN PATENT DOCUMENTS

WO  WO-2019/075316     4/2019
WO  WO-2019/213407 A1  11/2019

*Primary Examiner* — Gary S Hartmann
(74) *Attorney, Agent, or Firm* — Foley & Lardner LLP

(57) ABSTRACT

A stand-on aerator includes a chassis, an operator platform extending from a rear portion of the chassis, an aerator assembly coupled to the chassis and having a plurality of reciprocating tines configured to extend from and retract into the aerator assembly, and an object detection sensor. At least a portion of the plurality of reciprocating tines are configured to retract in response to the object detection sensor detecting an object in a path of the aerator assembly.

20 Claims, 16 Drawing Sheets

(56) References Cited

U.S. PATENT DOCUMENTS

| | | | |
|---|---|---|---|
| 11,665,988 B2* | 6/2023 | Harvey | A01B 75/00 |
| | | | 172/21 |
| 2012/0211954 A1 | 8/2012 | Havener | |
| 2019/0174667 A1* | 6/2019 | Gresch | A01B 61/044 |
| 2019/0217319 A1 | 7/2019 | Harvey et al. | |
| 2019/0230850 A1 | 8/2019 | Johnson et al. | |

* cited by examiner

STAND-ON OUTDOOR POWER EQUIPMENT FOR AERATING SOIL

CROSS-REFERENCE TO RELATED PATENT APPLICATIONS

This application is a continuation of U.S. patent application Ser. No. 16/797,917, filed on Feb. 21, 2020, which claims the benefit of U.S. Provisional Application No. 62/808,893, filed Feb. 22, 2019, each of which is incorporated herein by reference in its entirety.

BACKGROUND

The present disclosure relates generally to outdoor power equipment such as turf aerators, and, more particularly, to stand-on aerators having various configurations such as, e.g., reciprocating tines within a drum assembly, suspension assemblies, etc.

Turf aeration is a common landscaping practice in many regions, where compacted soil is perforated to form numerous small holes throughout the lawn, thereby allowing air, water, and other nutrients to penetrate grass roots. Numerous types of mechanical aerators exist, including various forms of spike aerators and plug aerators. Spike aerators merely poke holes in the soil surface with a solid tine or fork, while plug aerators utilize hollow tines to remove numerous cores (or plugs) of grass and soil from the lawn. The tines may be forced into soil using mechanical and/or hydrostatic pressure. In some instances, the tines are coupled to support arms and are driven downward with a reciprocating action to remove the cores. In other instances, the tines may extend from a drum assembly, which rolls over the lawn surface and is forced downward toward the soil at varying pressures so as to allow the tines to penetrate the soil.

Many commonly-available mechanical aerators are of the walk-behind variety, which require an operator to walk behind the unit so as to steer and control the aerator. However, as commercial lawn care has become more prevalent and the benefits of turf aeration has become more apparent, a desire for faster, more comfortable turf aerators has developed. In response, several manufacturers have developed stand-on turf aerators, which not only mechanically perform the turf aeration, but also propel a standing operator as they maneuver the unit across a desired surface. In this way, a large area can be aerated in a relatively short period of time, allowing an operator complete the task in a more efficient and comfortable manner.

While stand-on aerators have become increasingly common, most rely on chain-driven drum assemblies to force the tines into the soil. However, due to the forces associated with penetrating the surface of the lawn, as well as the dirt and debris inherently present during lawn aeration, chain-driven assemblies may be prone to chain stretch and wear, and may require consistent (and time-consuming) maintenance in order to ensure proper functionality.

Accordingly, for the reasons above, there is a desire for stand-on aerators that avoid chain-driven aerating assemblies. This patent document described devices that are intended to address the issues discussed above and/or other issues.

SUMMARY OF THE INVENTION

In accordance with an aspect of the disclosure, a stand-on aerator is disclosed, the stand-on aerator including a chassis and a pair of first wheels coupled to the chassis, wherein the first wheels are operable as drive wheels. The stand-on aerator also may include a pair of second wheels coupled to the chassis, as well as an operator platform extending from a rear portion of the chassis. The stand-on aerator may further include an aerator assembly coupled to the chassis. The aerator assembly may include a plurality of reciprocating tines capable of extending from and retracting into the aerator assembly.

Another embodiment of the invention relates to a stand-on aerator including a chassis, a pair of first wheels coupled to the chassis and operable as drive wheels, a pair of second wheels coupled to the chassis, a lift coupled to the chassis and the first pair of wheels, an operator platform extending from a rear portion of the chassis, and an aerator assembly coupled to the chassis. The lift is operable to change the distance between the first pair of wheels and the chassis. The aerator assembly comprises a plurality of tines.

Another embodiment of the invention relates to a stand-on aerator including a chassis, a pair of first wheels coupled to the chassis and operable as drive wheels, a pair of second wheels pivotally coupled to the chassis, an operator platform extending from a rear portion of the chassis, and an implement bracket coupled to the chassis. The implement bracket is configured to selectively receive a desired implement.

Another embodiment of the invention relates to a stand-on aerator that includes a chassis, an operator platform extending from a rear portion of the chassis, an aerator assembly coupled to the chassis and having a plurality of reciprocating tines configured to extend from and retract into the aerator assembly, and an object detection sensor. At least a portion of the plurality of reciprocating tines are configured to retract in response to the object detection sensor detecting an object in a path of the aerator assembly.

Another embodiment of the invention relates to a stand-on aerator that includes a chassis, an operator platform extending from a rear portion of the chassis, an aerator assembly coupled to the chassis and having a plurality of reciprocating tines configured to extend from and retract into the aerator assembly, and an object detection sensor positioned to detect an object in a path the plurality of reciprocating tines. The plurality of reciprocating tines are configured to retract into the aerator assembly in response to the object detection sensor detecting the object in the path of the plurality of reciprocating tines.

Another embodiment of the invention relates to a stand-on aerator that includes a chassis, an operator platform extending from a rear portion of the chassis, an aerator assembly coupled to the chassis and having a plurality of reciprocating tines configured to extend from and retract into the aerator assembly, and an object detection sensor. When the object detection sensor detects an object in a path of the aerator assembly, the aerator assembly is configured to retract a first subset of the plurality of reciprocating tines that are in the path of the object.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when an aerator is oriented as shown in the Figures.

Figure 1A:
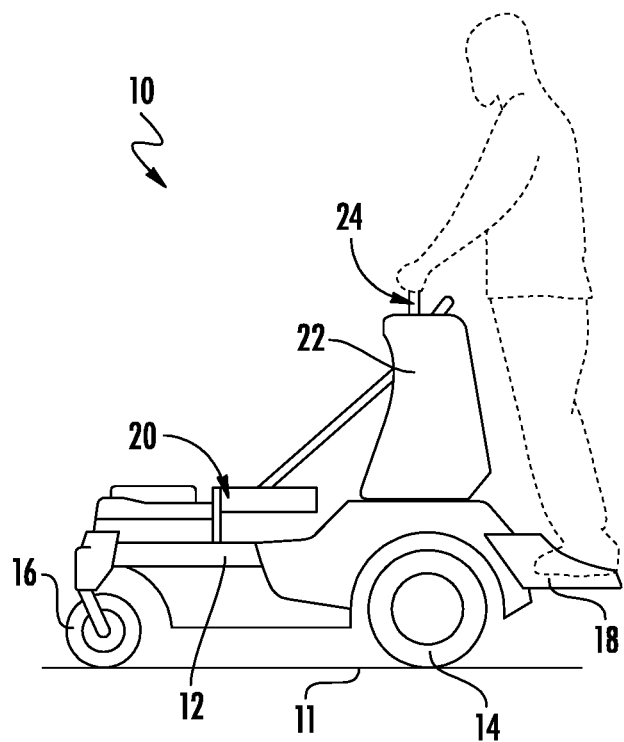
FIG. 1A is a side view of a stand-on aerator in a first configuration in accordance with an aspect of the disclosure.
Figure 1B:
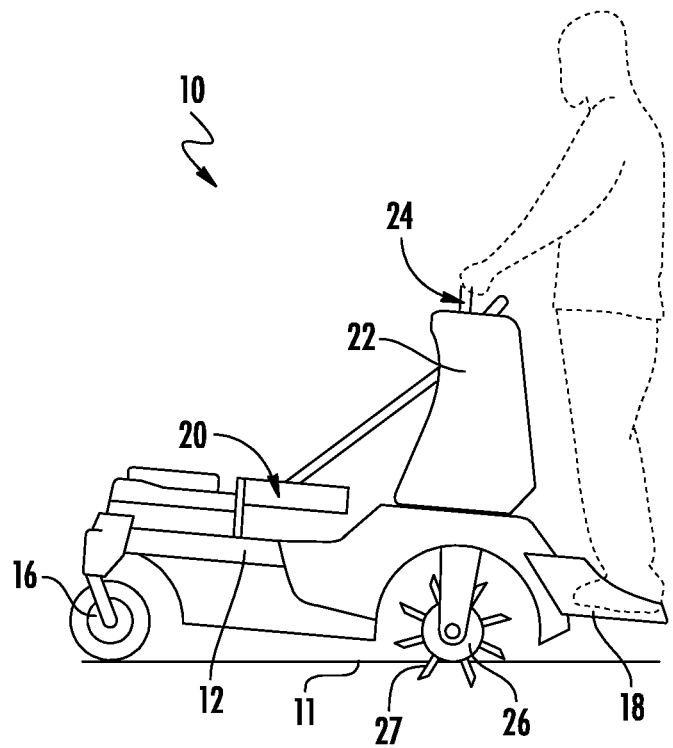
FIG. 1B is a side view of the stand-on aerator of FIG. 1A in a second configuration.

Referring to FIGS. 1A-1B, outdoor power equipment in the form of a stand-on aerator 10 in accordance with an aspect of the disclosure is shown. Stand-on aerator 10 includes a chassis 12, a pair of rear drive wheels 14, and a pair of front wheels 16. In some embodiments, rear drive wheels 14 are independently controllable so as to enable stand-on aerator 10 to maneuver with zero turn radius capabilities. Accordingly, while not shown, each respective drive wheel 14 may be operably coupled to a dedicated motor (i.e., a hydraulic motor, an electric motor, etc.) so as to allow each wheel to independently rotate in both forward and reverse directions. Relatedly, the front wheels 16 may be configured as caster wheels, freely rotating 360° to allow for zero turn radius maneuverability of stand-on aerator 10. The motors coupled drive wheels 14 and/or other implements (e.g., an aerator drum 26) may be powered by an on-board power head 20. Power head 20 may be any appropriate power source, such as an internal combustion engine, an electrical generator, and/or one or more batteries. As such, it is to be understood that drive wheels and implements of stand-on aerator 10 may be engine-driven, hybrid gas-electric driven, electric motor-driven, or any combination thereof.

Extending vertically from chassis 12 is a control tower 22, which supports various operator controls 24 (e.g., forward and reverse drive controls, implement controls, etc.) in a position forward of and within reach of the operator when the operator is positioned on an operator platform 18 disposed to the rear of chassis 12. Accordingly, the platform 18 enables the operator to travel with stand-on aerator 10, thereby enabling stand-on aerator 10 to be capable of travelling at speeds independent of the operator's maximum walking speed.

As described above, many conventional stand-on aerators comprise a rolling drum aerator that is mechanically or hydraulically pressed into the soil via a dedicated pressure assembly. As such, the aerator drum and drive wheels are disposed on different axes, and the aerator drum is driven by one or more chains, which may stretch or fail if not properly maintained. However, referring now to FIGS. 1B-1D, stand-on aerator 10 is configured to include a rolling drum aerator assembly 28. Aerator drum assembly 28 includes an aerator drum 26 which is disposed coaxially with the respective drive wheels 14. Extending from the aerator drum 26 are a plurality of tines 27. The tines 27 may be configured as solid tines or as hollow tines, thereby enabling cores of grass soil to be extracted from a lawn surface. While not shown in FIGS. 1B-1D, aerator drum 26 may be operably coupled to the same motor(s) configured to drive the drive wheels 14, thereby enabling aerator drum 26 to rotate in concert with drive wheels 14. Alternatively, aerator drum 26 may include one or more dedicated motors separate from the motor(s) driving drive wheels 14

Figure 1C:
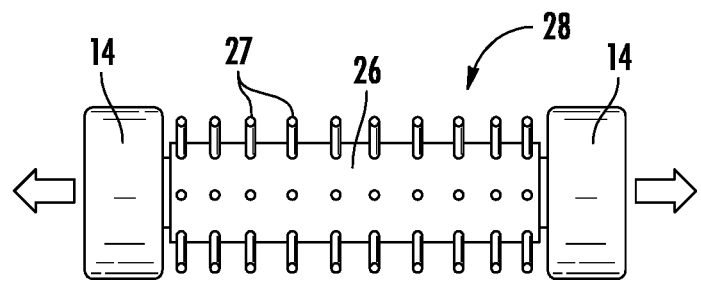
FIG. 1C is a front view of a pair of drive wheels and aerator drum of the stand-on aerator of FIG. 1A.
Figure 1D:
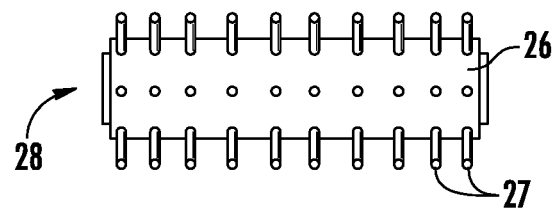
FIG. 1D is a front view of the aerator drum of FIG. 1C.

As is illustrated in FIG. 1C, the diameter of drive wheels 14 is greater than the widest diameter of aerator drum assembly 28. Accordingly, when drive wheels 14 are in place on respective ends of aerator drum assembly 28, the tines 27 do not come into contact with the ground surface 11, thereby allowing the stand-on aerator 10 to be driven across the ground surface 11 without aerating the soil. However, if drive wheels 14 are removed (as shown in FIGS. 1B and 1D), the stand-on aerator 10 may be driven by the aerator drum assembly 28 as opposed to drive wheels 14. In this way, the tines 27 extending from aerator drum 26 not only puncture the ground surface 11 so as to aerate the soil, but also act to propel the stand-on aerator 10 in at least a forward and reverse direction. The weight of the operator and the other components of the stand-on aerator 10 may help to force the tines 27 into the ground surface 11, obviating the need for a separate mechanism to force the aerator drum assembly 28 downward. When an aerating procedure is completed, the operator simply needs to re-install the drive wheels 14, which allows the move across the soil surface 11 without performing aeration.

Next, referring to FIGS. 2A-2D, a stand-on aerator 30 in accordance to another aspect of the disclosure is shown. Like stand-on aerator 10 described above, stand-on aerator 30 includes a chassis 32, a pair of rear drive wheels 34, and a pair of front wheels 36. In some embodiments, rear drive wheels 34 are independently controllable so as to enable stand-on aerator 30 to maneuver with zero turn radius capabilities. Accordingly, while not shown, each respective drive wheel 34 may be operably coupled to a dedicated motor (i.e., a hydraulic motor, an electric motor, etc.) so as to allow each wheel to independently rotate in both forward and reverse directions. Relatedly, the front wheels 36 may be configured as caster wheels, freely rotating 360° to allow for zero turn radius maneuverability of stand-on aerator 30. The motors coupled drive wheels 34 and/or other implements may be powered by an on-board power head 40. Power head 40 may be any appropriate power source, such as an internal combustion engine, an electrical generator, and/or one or more batteries. As such, it is to be understood that drive wheels and implements of stand-on aerator 30 may be engine-driven, hybrid gas-electric driven, electric motor-driven, or any combination thereof.

Extending vertically from chassis 32 is a control tower 42, which supports various operator controls 44 (e.g., forward and reverse drive controls, implement controls, etc.) in a position forward of and within reach of the operator when the operator is positioned on a platform 38 disposed to the rear of chassis 32. Accordingly, the platform 38 enables the operator to travel with stand-on aerator 30, thereby enabling stand-on aerator 30 to be capable of travelling at speeds independent of the operator's maximum walking speed.

Figure 2A:
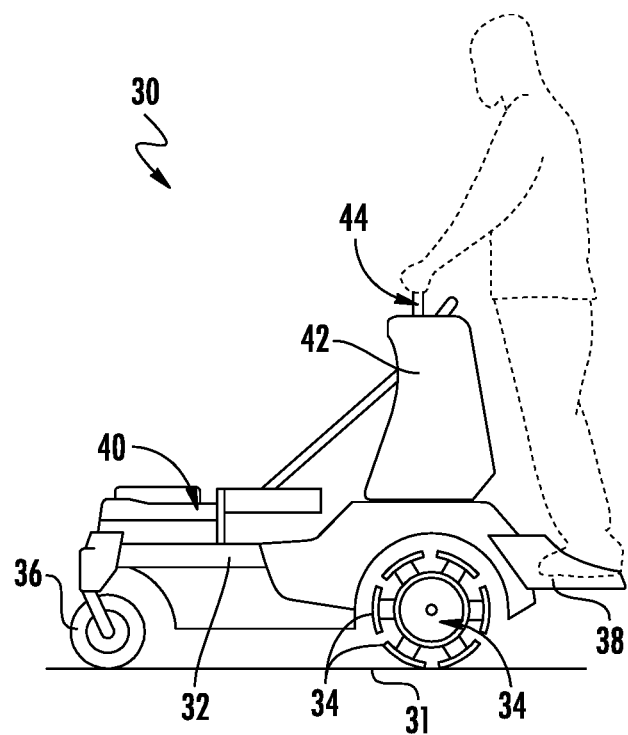
FIG. 2A is a side view of a stand-on aerator in a first configuration in accordance with another aspect of the disclosure.
Figure 2B:
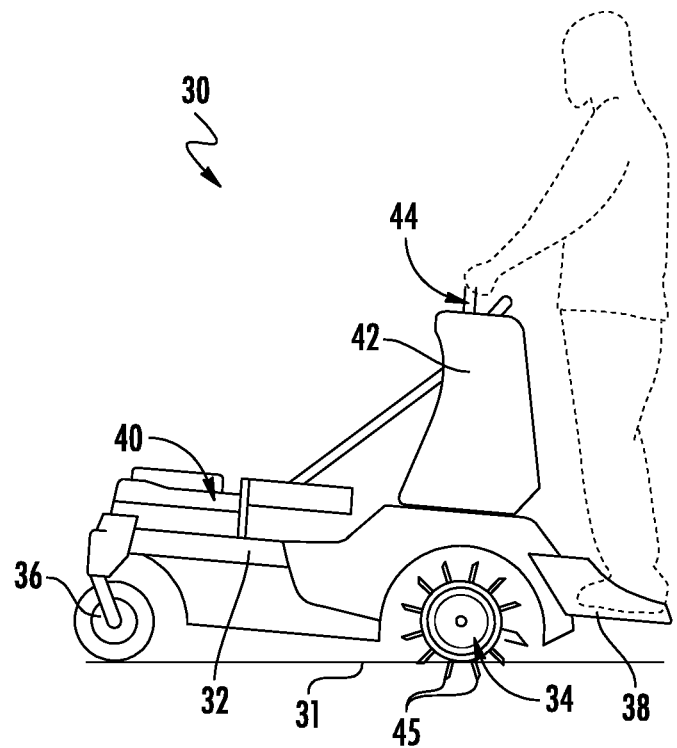
FIG. 2B is a side view of the stand-on aerator of FIG. 2A in a second configuration.
Figure 2C:
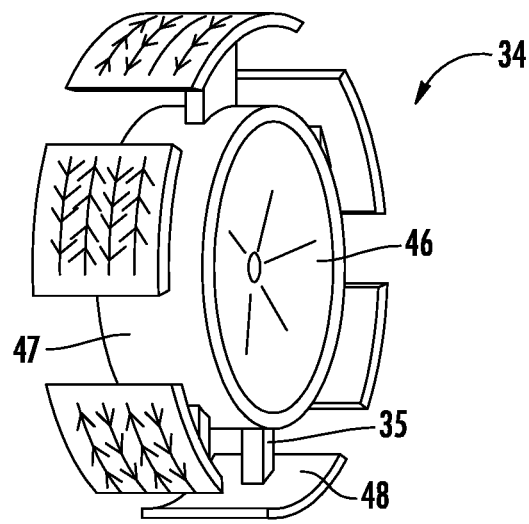
FIG. 2C is a perspective view of a drive wheel assembly of the stand-on aerator of FIG. 2A.
Figure 2D:
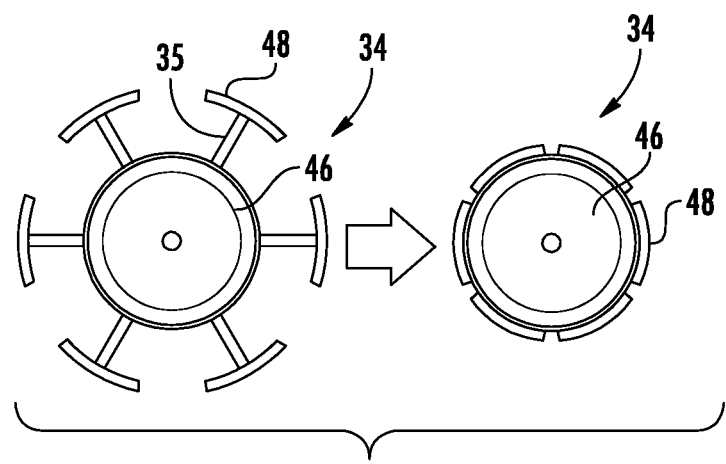
FIG. 2D is a side view of the drive wheel assembly of FIG. 2C in various configurations.

Similar to stand-on aerator 10 described above with respect to FIGS. 1A-1D, stand-on aerator 30 may include a rolling drum aerator (not shown) having a plurality of tines 45 extending therefrom, with the rolling drum aerator being positioned coaxially between rear drive wheels 34. However, unlike stand-on aerator 10, which requires the removal of the drive wheels to allow the tines to engage with the ground surface, the rear drive wheels 34 of stand-on aerator 30 include a plurality of retractable treads 48 disposed radially about a hub portion 46, which allow the diameter of the drive wheels 34 to be adjusted from a fully-extended position (as shown in FIG. 2A) to a fully-retracted position (as shown in FIG. 2B), wherein the fully-retracted position enables the tines 45 to engage the ground surface 31. Specifically, as shown in FIGS. 2C-2D, each rear wheel 34 includes a plurality of retractable treads 48 positioned on a distal end of a corresponding plurality of stem members 35, wherein the stem members 35 are configured to both extend from and retract into the hub portion 46. The stem members 35 may be extended and/retracted though any appropriate means, such as mechanically, hydraulically, electrically, and/or any combination thereof.

As such, when the operator wishes to drive the stand-on aerator 30 in a non-aerating configuration (FIG. 2A), the operator may provide instructions via the operator controls 44 that the stem members 35 should fully extend away from the radial surface 47 of hub portion 46. However, when the operator wishes to drive the stand-on aerator 30 in an aerating configuration (FIG. 2B), instructions may be provided via the operator controls 44 to retract the stem members 35 into the hub portion 46, thereby drawing the retractable treads 48 onto the radial surface 47 and allowing the tines 45 to extend radially beyond the retractable treads 48 to puncture the ground surface 31. In this way, a drum-type aerator may be positioned coaxially with the drive wheels, but the drive wheels need not be removed to initiate an aerating procedure.

Figure 3A:
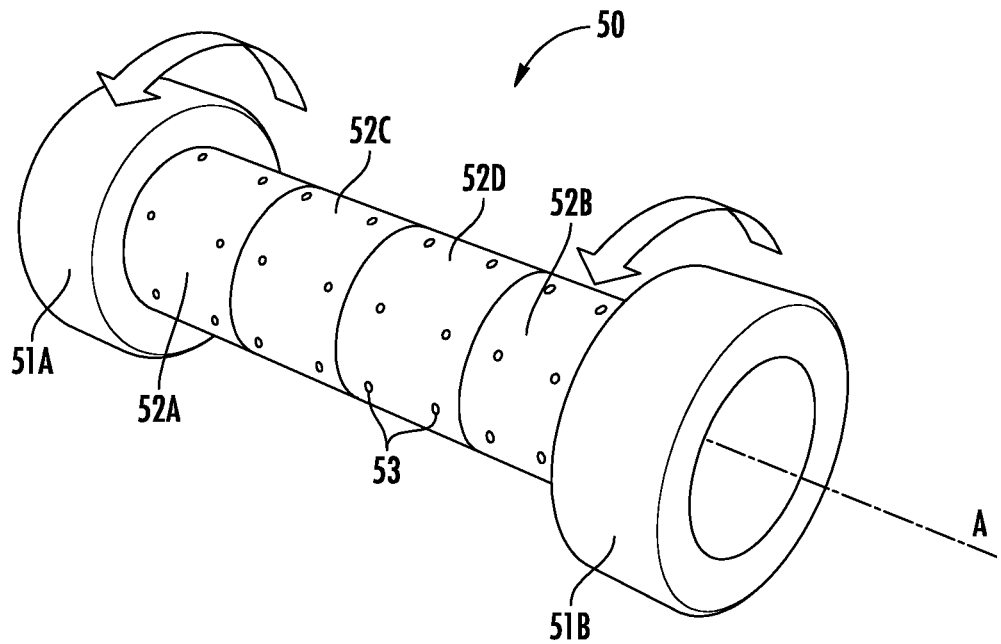
FIG. 3A is a perspective view of a drive wheel and aerator drum assembly for a stand-on aerator in a first configuration in accordance with another aspect of the disclosure.
Figure 3B:
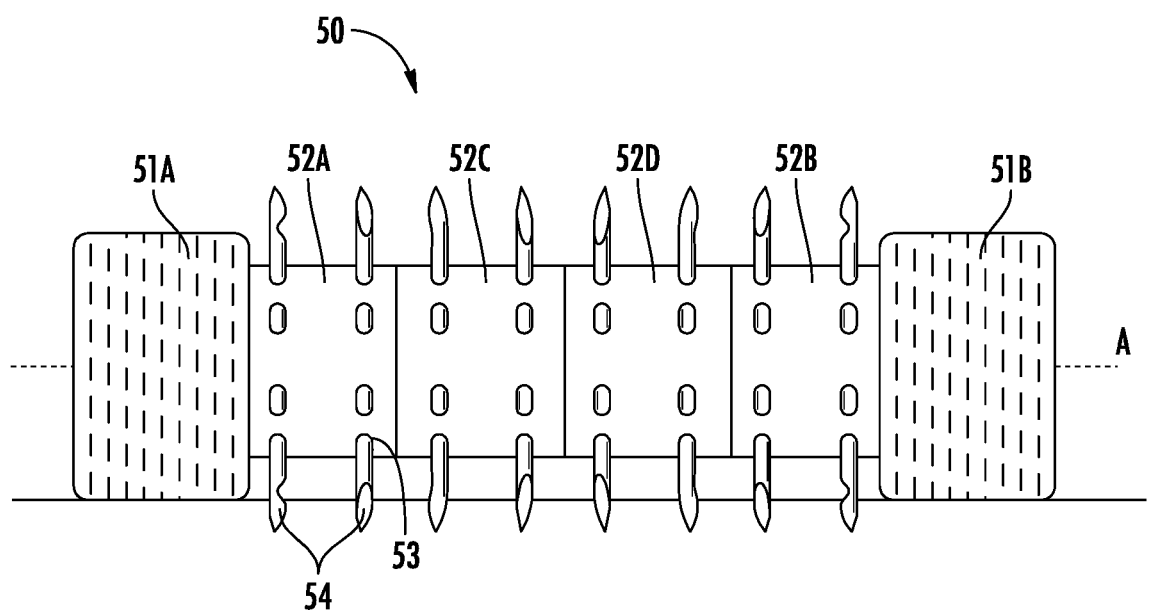
FIG. 3B is a front view of the drive wheel and aerator drum assembly of FIG. 3A in a second configuration.
Figure 3C:
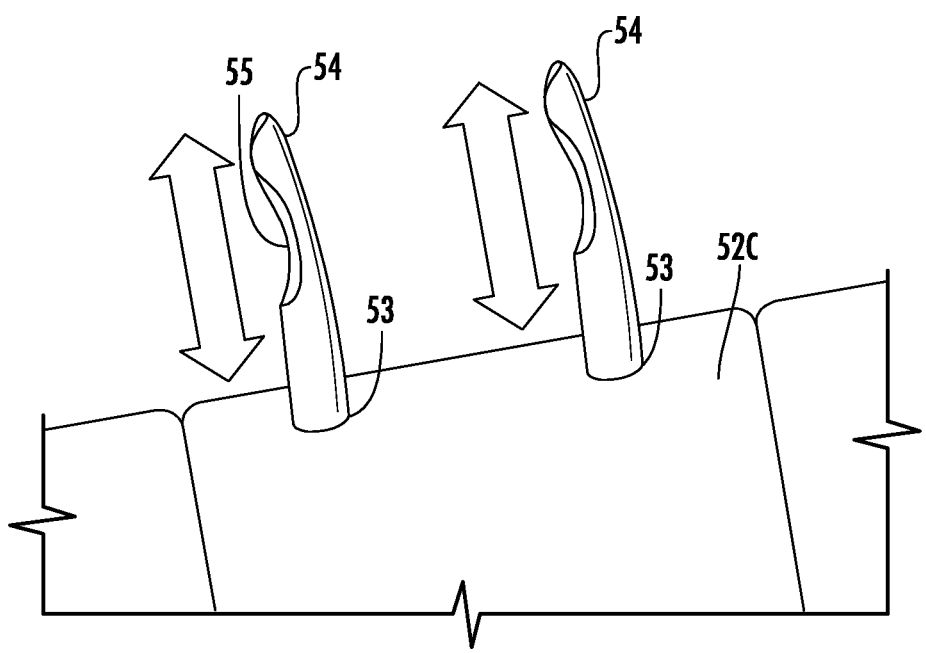
FIG. 3C is a detailed view of a portion of the aerator drum assembly of FIG. 3B.

Referring now to FIGS. 3A-3C, a rolling drum aerator assembly 50 in accordance with another aspect of the disclosure is illustrated. While not shown, it is to be understood that rolling drum aerator assembly 50 may be utilized in conjunction with a stand-on aerator similar to those shown and described above with respect to FIGS. 1A and 2A. Rolling drum aerator assembly 50 includes a pair of opposing drive wheels 51A, 51B rotatable about an axis A. While not shown, it is to be understood that drive wheels 51A, 51B each may be operably coupled to a dedicated wheel motor so as to allow the drive wheels 51A, 51B to independently rotate in either a forward or reverse direction so as to allow for zero turn radius operability of the stand-on aerator. The wheel motors may be any appropriate wheel motor (e.g., hydraulic motors, electric motors, etc.).

Coaxially disposed between the respective drive wheels 51A, 51B are four drum members 52A, 52B, 52C, 52D, which together form a rolling drum aerator. While four drum members 52A, 52B, 52C, 52D are shown, it is to be understood that fewer or more drum members may be utilized. Each drum member 52A, 52B, 52C, 52D may rotate independent of the others. More specifically, the drum members immediately adjacent the drive wheels (i.e., drum members 52A, 52B) may be operably coupled to the drive wheels so as to rotate in the same direction as the drive wheels (51A, 51B), while the centrally-located drum members (i.e., drum members 52C, 52D) may be configured to freewheel relative to the outer drum members 52A, 52B. As will be described in further detail below, this decoupled configuration between the drum members 52A, 52B, 52C, 52D allows for zero turn radius maneuverability during aeration without undesirable damage to the turf surface during turning.

As shown in FIGS. 3A-3C, each drum member 52A, 52B, 52C, 52D includes a plurality of tine openings 53 radially positioned about the circumference of each drum member 52A, 52B, 52C, 52D. As shown in FIGS. 3B-3C, a plurality of tines 54 are configured to extend from respective plurality of tine openings 53, wherein each tine 54 is capable of being retraced and/or extended from a respective tine opening 53 in a selectively reciprocating manner. In this way, the rolling drum aerator assembly 50 may operate in a non-aerating configuration, as shown in FIG. 3A, or in an aerating configuration, as shown in FIG. 3B.

While not shown, it is to be understood that the tines 54 may be coupled to any appropriate mechanism so as to effectuate reciprocation into and out of tine openings 53. For example, embodiment, each tine 54 may be spring-biased toward an extended position (FIG. 3B), but may also be coupled to an electric motor which is configured to overcome the spring force so as to retract the tines 54. With such a configuration, the spring force may also serve to protect the tines 54 and overall assembly from damage in the event that the tines 54 hit a rock, root, or other non-permeable surface. In other embodiments, each tine 54 may be mechanically, hydraulically, pneumatically, or electrically forced into an extended position using any appropriate means. In some embodiments, the tines 54 may be individually controlled. In other embodiments, some or all of the tines 54 may be operable coupled to one another such that reciprocation of some or all of the tines 54 is coordinated.

As discussed above, the decoupled configuration between the drum members 52A, 52B, 52C, 52D allows for zero turn radius maneuverability during aeration without undesirable damage to the turf surface during turning. That is, during a zero turn radius turning event, the first drive wheel 51A rotates in a first direction, while the second drive wheel 51B rotates in a second, opposite direction. The drum member 52A (and its associated tines) rotate with the first drive wheel 51A, while the drum member 52B (and its associated tines) rotate with the second drive wheel 51B. However, the central drum members 52C, 52D may be configured to freewheel relative to the drum members 52A, 52B, thereby allowing the central drum members 52C, 52D to rotate in either or both directions during a turning operation, which prevents the tines extending from the central drum members 52C, 52D from tearing across the lawn surface during a turning operation. Additionally, with the drum members 52A, 52B, 52C, 52D and drive wheels 51A, 51B being disposed on the same axis A, it is possible for the same motors utilized to drive the drive wheels 51A, 51B to be used to rotate the drum members 52A, 52B, 52C, 52D and/or control the reciprocation of the tines 54, thereby reducing the cost, complexity, and weight associated with additional motors and/or other componentry commonly used in existing rolling drum aerator configurations, while still allowing the frequency of reciprocation of the tines 54 to be independent of the rotational speed of the drive wheels 51A, 51B.

Referring to FIG. 3C, in accordance with one aspect of the disclosure, each retractable tine 54 may be hollow in construction and include an opening 55 formed therein so as to allow for a core of grass and soil to be removed during the aeration procedure. However, it is to be understood that the all or some of the tines 54 are not limited to such a construction, and may be configured as solid tines instead.

Figure 4A:
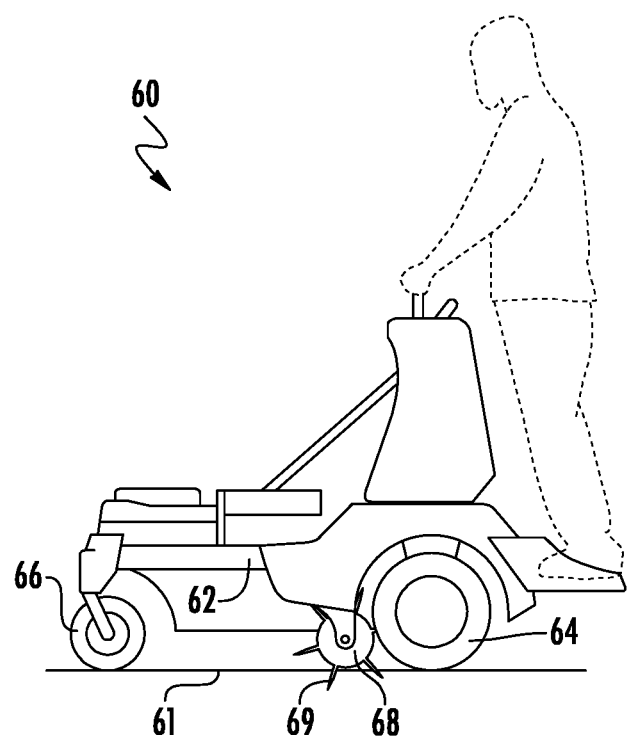
FIG. 4A is a side view of a stand-on aerator in a first configuration in accordance with another aspect of the disclosure.
Figure 4B:
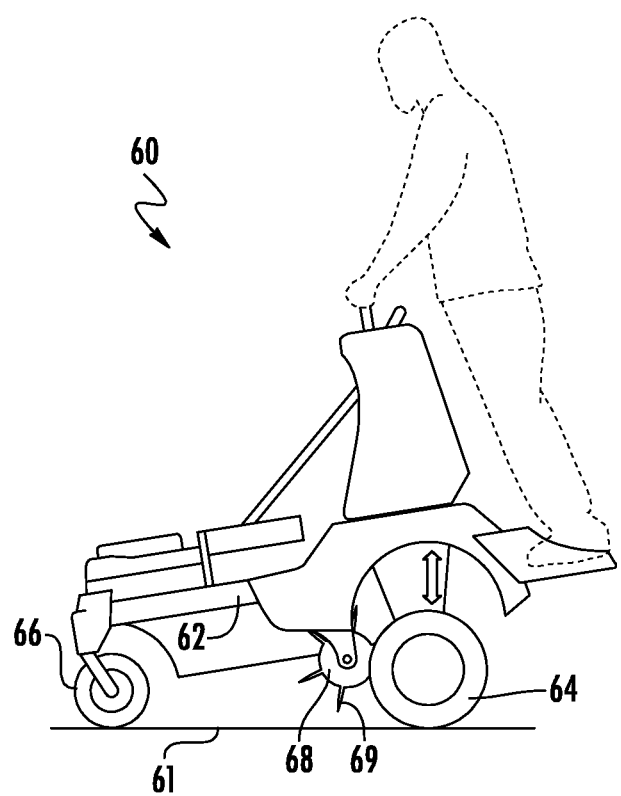
FIG. 4B is a side view of the stand-on aerator of FIG. 4A in a second configuration.

Next, FIGS. 4A-4B illustrate a stand-on aerator 60 in accordance with another aspect of the disclosure. It is to be understood that many of the components of stand-on aerator 60 are the same or similar to components of stand-on aerator 10 and/or stand-on aerator 30 as described above. Accordingly, the presence and function of at least some similar components will not be reiterated herein. Stand-on aerator 60 includes a chassis 62, rear drive wheels 64, and front wheels 66, and stand-on aerator 60 is configured to be maneuverable across soil surface 61, preferably in a zero turn radius fashion. However, unlike the stand-on aerators described above with respect to FIGS. 1A-3C, stand-on aerator 60 does not include a rolling drum aerator that is coaxially in-line with the rear drive wheels. Rather, stand-on aerator 60 includes a rolling drum member 68 that is rotatable relative to chassis 62, but that extends from a fixed position below chassis 62. As shown in FIG. 4A, a plurality of tines 69 radially extending from rolling drum member 68 may penetrate the ground to provide aeration, with the rolling drum member 68 being held in this "aerating" position simply by virtue of its fixed position relative to chassis 62.

Conversely, to remove the rolling drum member 68 from the "aerating" position, and as shown in FIG. 4B, the stand-on aerator 60 may be equipped to lift a rear portion of the chassis 62 away from the rear drive wheels 64, which also acts to lift the rolling drum member 68 away from the soil surface 61. The lifting action may be achieved through any appropriate means, such as hydraulically, mechanically, electro-mechanically, etc. Accordingly, stand-on aerator 60 may utilize the weight of the operator and the machine itself to hold the rolling drum member 68 in the "aerating" position, while relying on other means to remove the rolling drum member 68 from the "aerating" position.

Figure 5A:
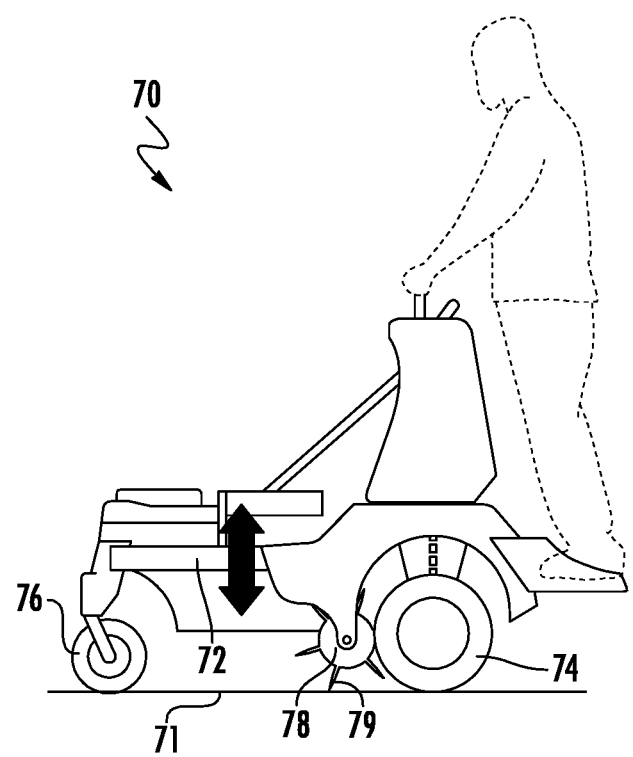
FIG. 5A is a side view of a stand-on aerator in a first configuration in accordance with another aspect of the disclosure.
Figure 5B:
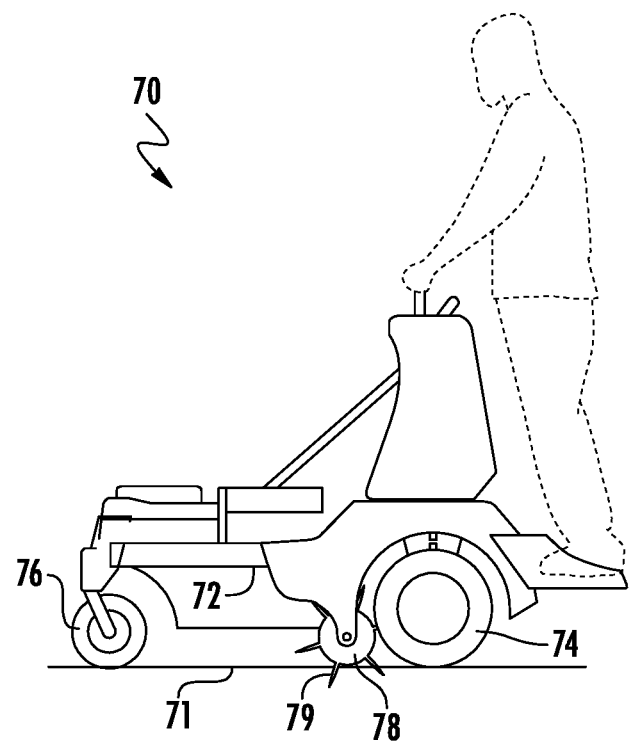
FIG. 5B is a side view of the stand-on aerator of FIG. 5A in a second configuration.

Similarly, FIGS. 5A-5B illustrate a stand-on aerator 70 in accordance with another aspect of the disclosure. Again, it is to be understood that many of the components of stand-on aerator 70 are the same or similar to components of stand-on aerator 10 and/or stand-on aerator 30 as described above. Accordingly, the presence and function of at least some similar components will not be reiterated herein. Stand-on aerator 70 includes a chassis 72, rear drive wheels 74, and front wheels 76, and stand-on aerator 70 is configured to be maneuverable across soil surface 71, preferably in a zero turn radius fashion. However, unlike the stand-on aerators described above with respect to FIGS. 1A-3C, stand-on aerator 70 does not include a rolling drum aerator that is coaxially in-line with the rear drive wheels. Rather, stand-on aerator 70 includes a rolling drum member 78 that is rotatable relative to chassis 72, but that extends from a fixed position below chassis 72. As shown in FIG. 5B, a plurality of tines 79 radially extending from rolling drum member 78 may penetrate the ground to provide aeration, with the rolling drum member 78 being held in this "aerating" position simply by virtue of its fixed position relative to chassis 72.

Conversely, to remove the rolling drum member 78 from the "aerating" position, and as shown in FIG. 5A, the stand-on aerator 70 may be equipped to lift the entire chassis 72 relative to both the rear drive wheels 74 and front wheels 76, which also acts to lift the rolling drum member 78 away from the soil surface 71. The lifting action may be achieved through any appropriate means, such as hydraulically, mechanically, electro-mechanically, etc. Accordingly, stand-on aerator 70 may utilize the weight of the operator and the machine itself to hold the rolling drum member 78 in the "aerating" position, while relying on other means to remove the rolling drum member 78 from the "aerating" position.

Figure 6A:
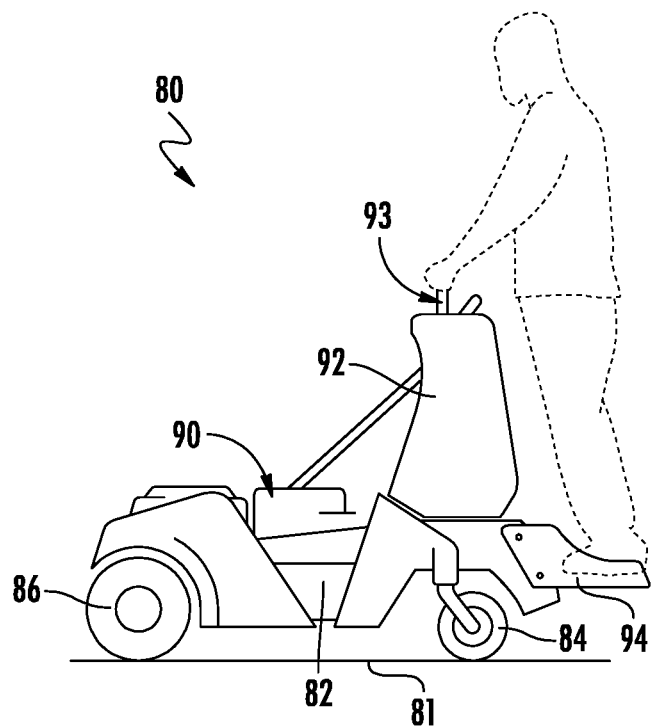
FIG. 6A is a side view of a stand-on aerator in a first configuration in accordance with another aspect of the disclosure.
Figure 6B:
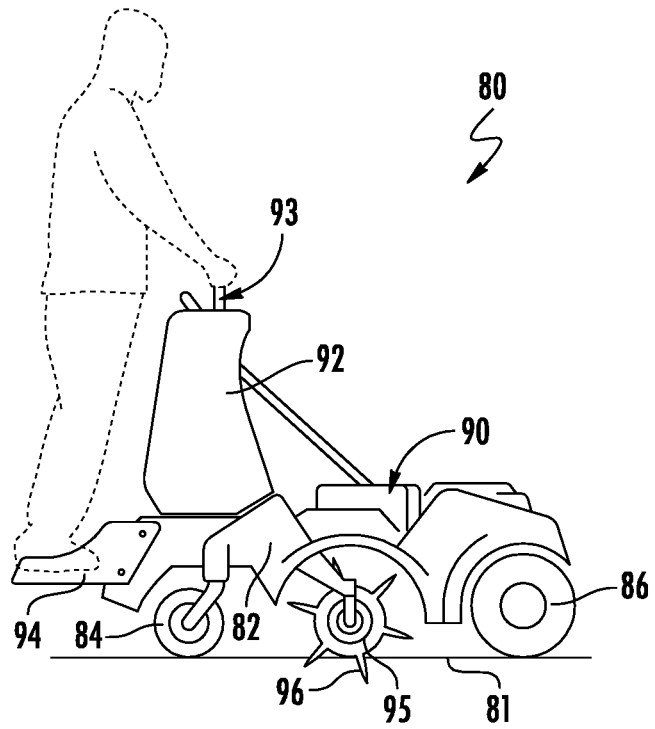
FIG. 6B is a side view of the stand-on aerator of FIG. 6A in a second configuration.

Next, referring to FIGS. 6A-6B, a stand-on aerator 80 in accordance with yet another aspect of the disclosure is illustrated. Unlike the stand-on aerators disclosed above, stand-on aerator 80 is configured with a "rover-type" chassis, wherein the drive wheels and rolling drum aerator are positioned in the front of the vehicle, while the caster wheel(s) are positioned toward the rear of the vehicle. This positioning may be advantageous in that it further isolates the operator from both the drive wheels and the rolling drum aerator, potentially reducing operator-sensed forces and vibration and, thus, operator fatigue.

Stand-on aerator 80 includes a chassis 82, a pair of front drive wheels 86, and at least one rear caster wheel 84. In some embodiments, front drive wheels 86 are independently controllable so as to enable stand-on aerator 80 to maneuver with a tighter turn radius across soil surface 81. Accordingly, while not shown, each respective drive wheel 86 may be operably coupled to a dedicated motor (i.e., a hydraulic motor, an electric motor, etc.) so as to allow each wheel to independently rotate in both forward and reverse directions. The rear wheel(s) 84 may be configured as caster wheels, freely rotating 360° to allow for improved maneuverability of stand-on aerator 80. The motors coupled drive wheels 86 and/or other implements (e.g., a rolling drum aerator 95 shown in FIG. 6B) may be powered by an on-board power head 90. Power head 90 may be any appropriate power source, such as an internal combustion engine, an electrical generator, and/or one or more batteries. As such, it is to be understood that drive wheels and implements of stand-on aerator 80 may be engine-driven, hybrid gas-electric driven, electric motor-driven, or any combination thereof.

Extending vertically from chassis 82 is a control tower 92, which supports various operator controls 94 (e.g., forward and reverse drive controls, implement controls, etc.) in a position forward of and within reach of the operator when the operator is positioned on a platform 94 disposed to the rear of chassis 82. Accordingly, the platform 18 enables the operator to travel with stand-on aerator 80, thereby enabling stand-on aerator 80 to be capable of travelling at speeds independent of the operator's maximum walking speed.

As is also shown in FIG. 6B, the stand-on aerator 80 may include a rolling drum aerator 95 positioned between the front drive wheels 86 and rear wheel 84. The rolling drum aerator 95 may include a plurality of tines 96 extending radially therefrom so as to penetrate the soil surface 81 during an aeration procedure. While not shown, it is to be understood that the rolling drum aerator 95 may be lifted and lowered relative to the soil surface 81 through any appropriate means, including but not limited to hydraulically, mechanically, or electro-mechanically.

Figure 7A:
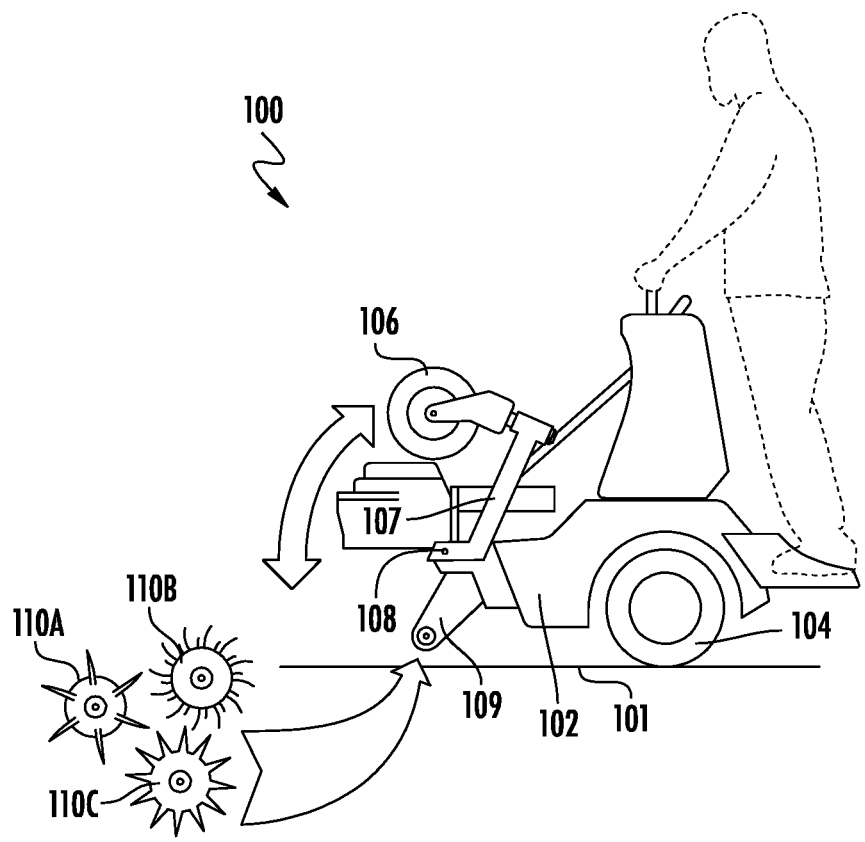
FIG. 7A is a side view of a stand-on aerator in a first configuration in accordance with another aspect of the disclosure.
Figure 7B:
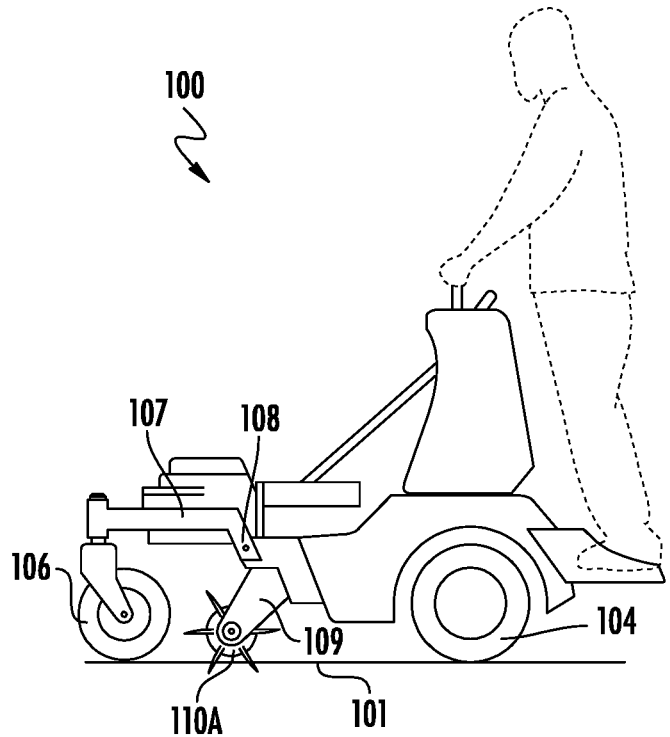
FIG. 7B is a side view of the stand-on aerator of FIG. 7A in a second configuration.

Referring now to FIGS. 7A-7B, a stand-on aerator 100 in accordance with another aspect of the disclosure is illustrated. It is to be understood that many of the components of stand-on aerator 100 are the same or similar to components of stand-on aerators described above, such as stand-on aerator 10 and/or stand-on aerator 30. Accordingly, the presence and function of at least some similar components will not be reiterated herein. Stand-on aerator 100 includes a chassis 102, rear drive wheels 104, and front wheels 106, and stand-on aerator 100 is configured to be maneuverable across soil surface 101, preferably in a zero turn radius fashion.

As shown in FIG. 7A, front wheels 106 are pivotally coupled to chassis 102 via at least one pivotal arm 107, which pivots about a pivot point 108 such that front wheels 106 may be lifted away from the soil surface 101. In this way, the operator may access an implement bracket 109 which extends below chassis 102 toward the soil surface 101. Implements bracket 109 is configured to enable different implements, such as various aerator assemblies 110A, 110B, 110C, to be selectively provided on the stand-on aerator 100. Accordingly, the operator may easily access the implement bracket 109 so as to select and install a desired implement. While various aerator assemblies 110A, 110B, 110C are shown in FIG. 7A, it is to be understood that implements other than aerators may be couplable to implement bracket 109. Additionally and/or alternatively, the implement bracket 109 may be configured as a "kick-stand" so as to hold the front portion of stand-on aerator 100 in an elevated position as front wheels 106 are pivoted away from the soil surface 101, thereby allowing the operator to change implements in the field.

Figure 8:
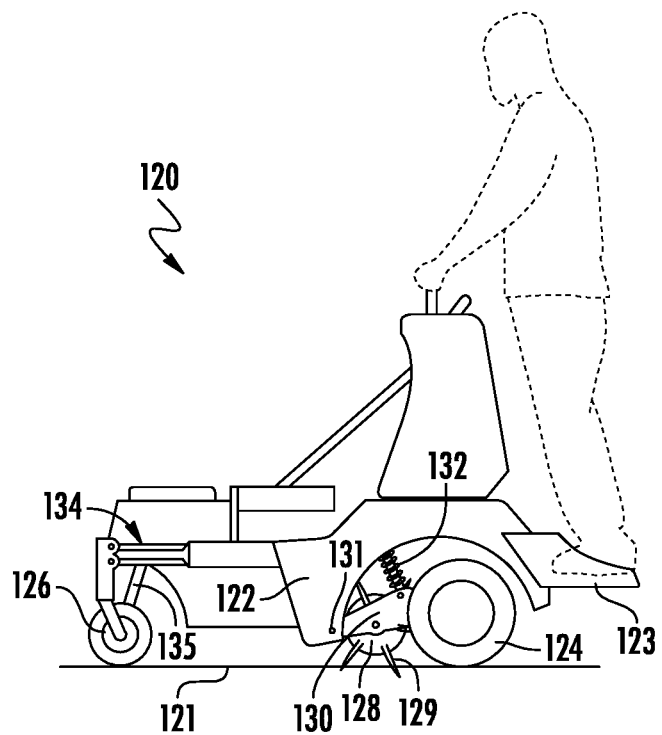
FIG. 8 is a side view of a stand-on aerator having a suspension configuration in accordance with another aspect of the disclosure.

Next, referring to FIG. 8, a stand-on aerator 120 in accordance with another aspect of the disclosure is shown. Stand-on aerator 120 includes a chassis 122, rear drive wheels 124, and front wheels 126, and stand-on aerator 120 is configured to be maneuverable across soil surface 121, preferably in a zero turn radius fashion. An operator platform 123 is positioned on the chassis 122 so as to allow the operator to stand on, and be propelled by, the stand-on aerator 120. It is to be understood that many other components of stand-on aerator 120 are the same or similar to components of stand-on aerators described above, such as stand-on aerator 10 and/or stand-on aerator 30. Accordingly, the presence and function of at least some similar components will not be reiterated herein.

FIG. 8 also illustrates that rear drive wheels 124 are coupled to at least one arm 130 such that the rear drive wheels 124 pivot relative to chassis 122 about at least one pivot point 131. A rear suspension assembly 132 may be provided between the at least one arm 130 and the chassis 122 such that rear drive wheels 124 are suspended relative to chassis 122, thereby providing the standing operator positioned on platform 123 with greater comfort as the stand-on aerator 120 travels over uneven terrain. Rear suspension assembly 132 may include any appropriate suspension device or devices, such as, e.g., coil-over-shock devices, leaf springs, dampers, etc. Additionally, as is shown in FIG. 8, a rolling drum aerator 128 having a plurality of tines 129 may also be rotatably coupled to the at least one arm 130. In this way, the rolling drum aerator 128 is also capable of pivotal movement relative to the at least one pivot point 131 with the rear drive wheels 124 in response to changes in terrain. While rolling drum aerator 128 is shown as being offset from rear drive wheels 124 along the at least one arm 130, it is to be understood that the rolling drum aerator 128 may be positioned coaxially with the rear drive wheels, similar to that which is shown and described above with respect to FIGS. 1A-3C.

Additionally and/or alternatively, the front wheels 126 may also be suspended relative to the chassis 122. As shown in FIG. 8, a front suspension assembly 135 may be provided so as to allow the front wheels 126 to react to uneven terrain, thereby providing a more comfortable and stable ride for the operator. FIG. 8 further illustrates that each front wheel 126 may be pivotally coupled to the chassis 122 via a four-bar linkage 134, thereby providing for true vertical translation of the front wheels 126. However, it is to be understood that the front wheels 126 may be coupled to chassis 122 via any appropriate means, and is not limited to use with a four-bar linkage. Furthermore, while suspension assemblies are shown as being associated with both the front and rear wheels of the stand-on aerator 120, it is to be understood that, in accordance with other embodiments, a stand-on aerator may utilize only one of the front or rear suspension assemblies.

Figure 9:
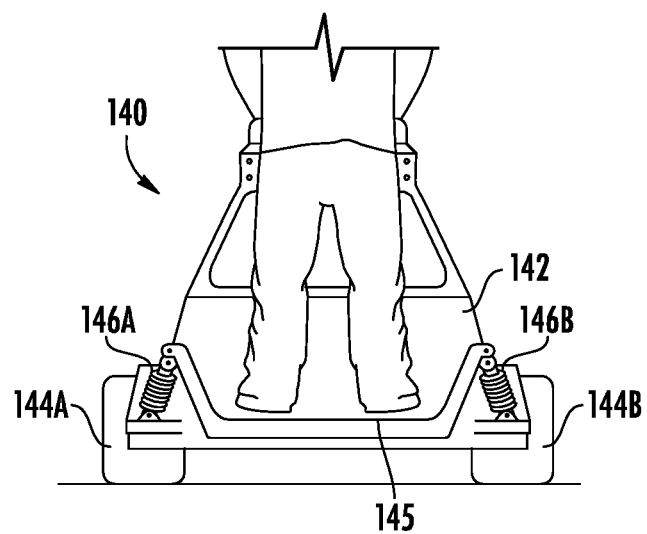
FIG. 9 is a rear view of a stand-on aerator having a suspension configuration in accordance with another aspect of the disclosure.

Next, referring to FIG. 9, a rear view of a stand-on aerator 140 in accordance with another aspect of the disclosure is shown. Unlike stand-on aerator 120 described above with respect to FIG. 8, stand-on aerator 140 does not apply the suspension assemblies directly to the front and/or rear wheels. Rather, stand-on aerator 140 includes a chassis 142 having a pair of rear drive wheels 144A, 144B, along with an operator platform 145 extending to the rear of chassis 142. While not shown, operator platform 145 is pivotally coupled to the chassis 142, and a pair of suspension assemblies 146A, 146B are coupled between operator platform 145 and chassis 142. In this way, impacts caused by travel over uneven terrain may be dampened by the pair of suspension assemblies 146A, 146B, providing the operator with a more comfortable experience. Suspension assemblies 146A, 146B may include any appropriate suspension device or devices, such as, e.g., coil-over-shock devices, leaf springs, dampers, etc. Additionally, while a pair of suspension assemblies 146A, 146B are shown in FIG. 9, is to be understood that more or fewer suspension assemblies may be utilized.

Figure 10A:
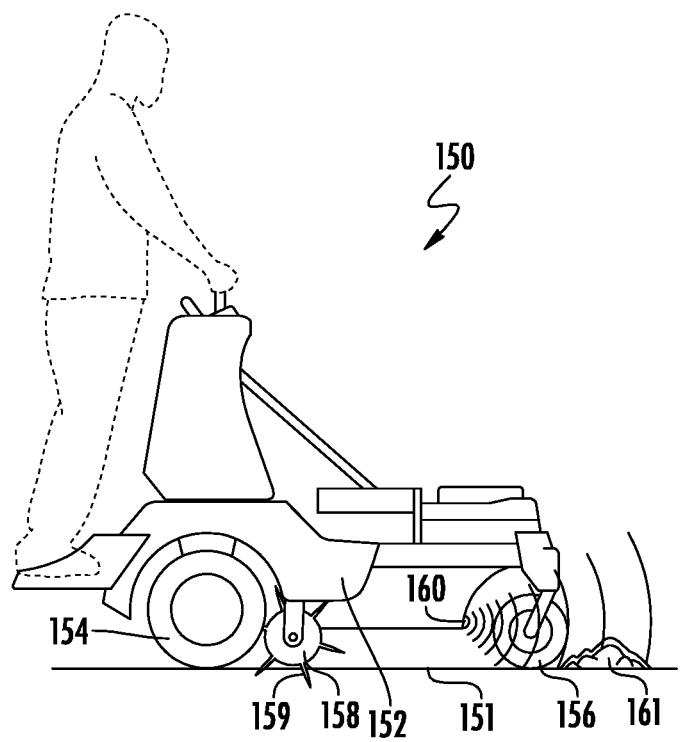
FIG. 10A is a side view of a stand-on aerator in accordance with another aspect of the disclosure.
Figure 10B:
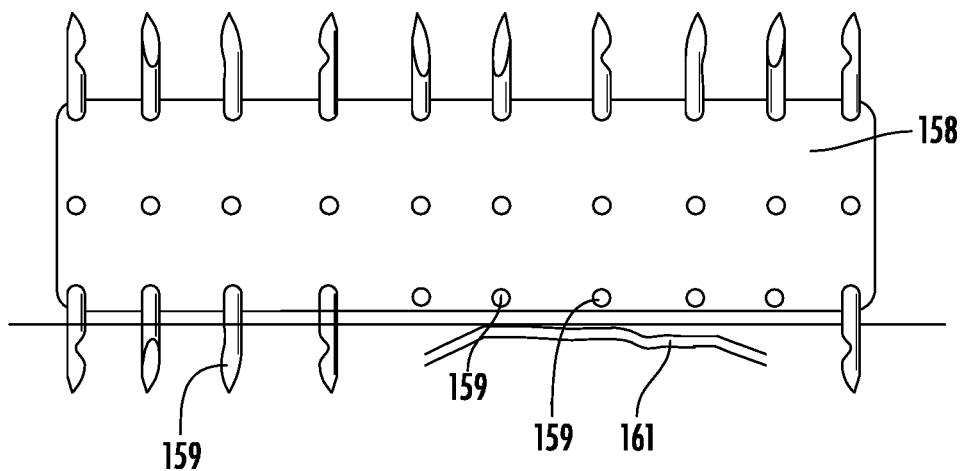
FIG. 10B is a front view of the aerator drum of the stand-on aerator of FIG. 10A.

Referring to FIGS. 10A-10B, a stand-on aerator 150 in accordance with another aspect of the disclosure is illustrated. It is to be understood that many of the components of stand-on aerator 150 are the same or similar to components of stand-on aerators described above, such as stand-on aerator 10 and/or stand-on aerator 30. Accordingly, the presence and function of at least some similar components will not be reiterated herein. Stand-on aerator 150 includes a chassis 152, rear drive wheels 154, and front wheels 156, and stand-on aerator 150 is configured to be maneuverable across soil surface 151, preferably in a zero turn radius fashion. Additionally, stand-on aerator 150 includes a rolling drum aerator 158 positioned below chassis 152, with rolling drum aerator 158 having a plurality of tines 159 extending therefrom and capable of penetrating the grass and soil of soil surface 151 as the stand-on aerator 150 travels. While rolling drum aerator 158 is shown as being rotatable about an axis separate from that of the rear drive wheels 154, it is to be understood that the rolling drum aerator and rear drive wheels may be coaxial, similar to that which is shown and described above with respect to FIGS. 1A-3C.

As shown in FIG. 10A, stand-on aerator 150 also includes at least one sensor 160 positioned so as to sense and/or detect objects forward of and/or below the stand-on aerator 150. The at least one sensor 160 may be one or more of any sensor capable of detecting objects, such as, e.g., camera(s), radar, sonar, thermal imaging device(s), etc. While not shown, it is to be understood that the at least one sensor 160 may be coupled, either wired or wirelessly, to a controller or other device having a processor capable of obtaining and deciphering the information received by the at least one sensor 160. In some embodiments, the controller may be on-board the stand-on aerator 150, while in other embodiments, the controller may be remote from the stand-on aerator 150.

Referring still to FIG. 10A, the at least one sensor 160 may be operable to detect obstacles in the path of the stand-on aerator 150, such as a rock 161 protruding from the soil surface 151. Typically, an operator would need to entirely avoid such a rock, or the aerator would strike the rock, potentially damaging the tines of the aerator and/or jarring the operator. However, as is shown in FIGS. 10A-10B, the stand-on aerator 150 is configured to utilize the sensor information obtained from the at least one sensor 160 so as to allow some or all of the tines 159 to avoid contact with obstacles in the aerator's path. As is shown in FIG. 10B, the rolling drum aerator 158 includes a plurality of tines 159 disposed radially thereon. Similar to the aerator drum described above with respect to FIGS. 3A-3C, the tines 159 of rolling drum aerator 158 may selectively extend and retract, providing for reciprocating tines. The tines 159 may reciprocate through any appropriate means, including the mechanical, electro-mechanical, hydraulic, and/or fully electric means discussed above with respect to FIGS. 3A-3C.

In the embodiment shown in FIGS. 10A-10B, when the at least one sensor 160 senses an obstacle in the path of the stand-on aerator 150 (e.g., a rock 161), that information may be processed such that at least some of the tines 159 are retracted so as to avoid contact with the obstacle, thereby preventing damage to the tines and providing for smoother travel. While FIG. 10B illustrates that only a subset of the tines 159 are retracted to avoid the obstacle, it is to be understood that in other embodiments, all tines 159 may be retracted upon detection of an obstacle. Furthermore, it is to be understood that the at least one sensor 160 may be utilized for purposes other than (or in addition to) obstacle avoidance. For example, the at least one sensor 160 could be utilized to recognize soil conditions to as to adjust tine depth and/or change aerating pattern/density based on the detected conditions.

Figure 11:
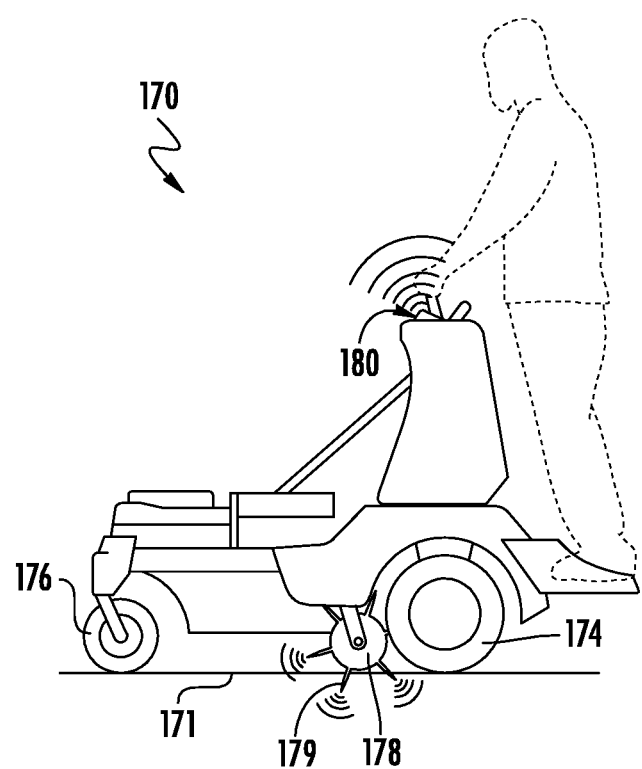
FIG. 11 is a side view of a stand-on aerator in accordance with another aspect of the disclosure.

Next, referring to FIG. 11, a stand-on aerator 170 in accordance with another aspect of the disclosure is shown. It is to be understood that many of the components of stand-on aerator 170 are the same or similar to components of stand-on aerators described above, such as stand-on aerator 10 and/or stand-on aerator 30. Accordingly, the presence and function of at least some similar components will not be reiterated herein. Stand-on aerator 170 includes rear drive wheels 174 and front wheels 176, and stand-on aerator 170 is configured to be maneuverable across soil surface 171, preferably in a zero turn radius fashion. Additionally, stand-on aerator 170 includes a rolling drum aerator 178, with rolling drum aerator 178 having a plurality of tines 179 extending therefrom and capable of penetrating the grass and soil of soil surface 171 as the stand-on aerator 170 travels. While rolling drum aerator 178 is shown as being rotatable about an axis separate from that of the rear drive wheels 174, it is to be understood that the rolling drum aerator and rear drive wheels may be coaxial, similar to that which is shown and described above with respect to FIGS. 1A-3C.

One or more of the tines 179 of rolling drum aerator 178 may include one or more sensors (not shown) housed therein or otherwise operably coupled thereto. These one or more sensors may be configured to communicate via wired or wireless means to a controller 180 on board the stand-on aerator 170. The one or more sensors associated with tines 179 may be any sensor capable of communicating information regarding one or more of soil conditions, pressure, etc. For example, in one embodiment, the one or more sensors associated with tines 179 may be utilized to communicate to the controller 180 that the rolling drum aerator 178 should be translated forward or backward, dependent upon a desired amount of preload on the rolling drum aerator 178 during operation.

In other embodiments, the one or more sensors may detect how easily the tines 179 are entering the soil surface 171 by monitoring, e.g., current draw if the tines are reciprocated via electrical or electro-mechanical means. For example, if soil conditions are soft, the amount of force needed for the tines 179 to puncture the soil will be lower than the force necessary in more compacted soil conditions. Thus, when soft soil conditions are detected, the amount of the force used to extend the tines 179 from the rolling drum aerator 178 and/or pressure applied to the rolling drum aerator 178 could be lessened so as to reduce power consumption. Similarly, the sensor(s) could be utilized to determine if the density, pattern, and/or depth of the cores of soil being removed during an aerating procedure are ideal or not, and changes can be made to, e.g., the distance the tines 179 extend from the rolling drum aerator 178, the amount of pressure applied by the rolling drum aerator 178 on the soil surface 171, etc. Furthermore, the sensor(s) could detect if and when the stand-on aerator 170 is performing a turning operation, and at least some of the tines 179 can be retracted into the rolling drum aerator 178 during such a turning operation so as to avoid soil damage.

Figure 12A:
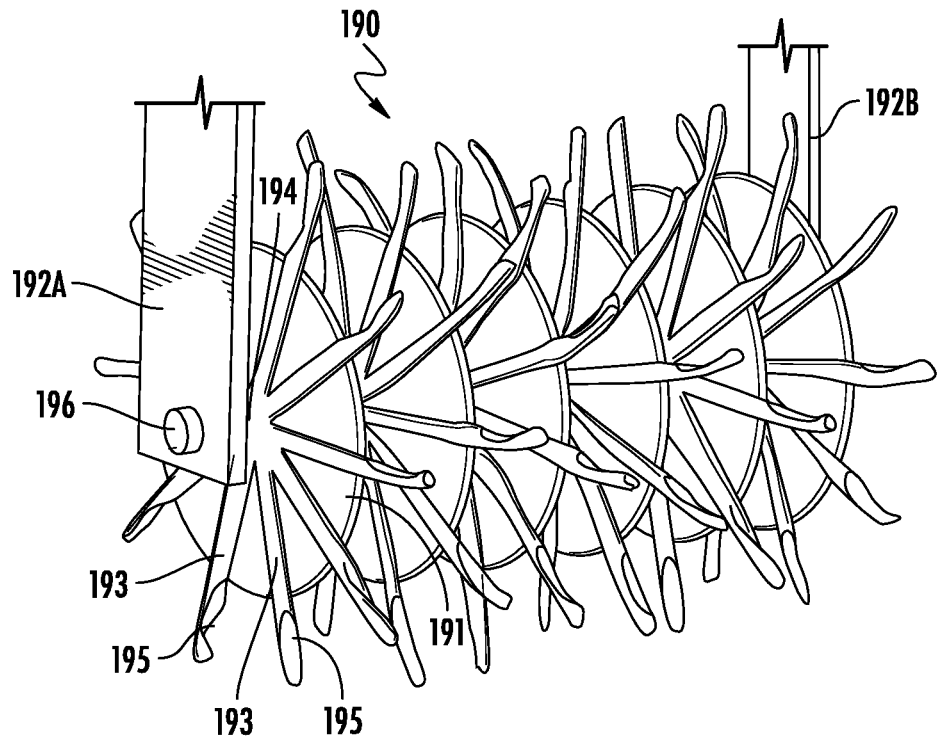
FIG. 12A is a perspective view of an aerator drum in accordance with another aspect of the disclosure.
Figure 12B:
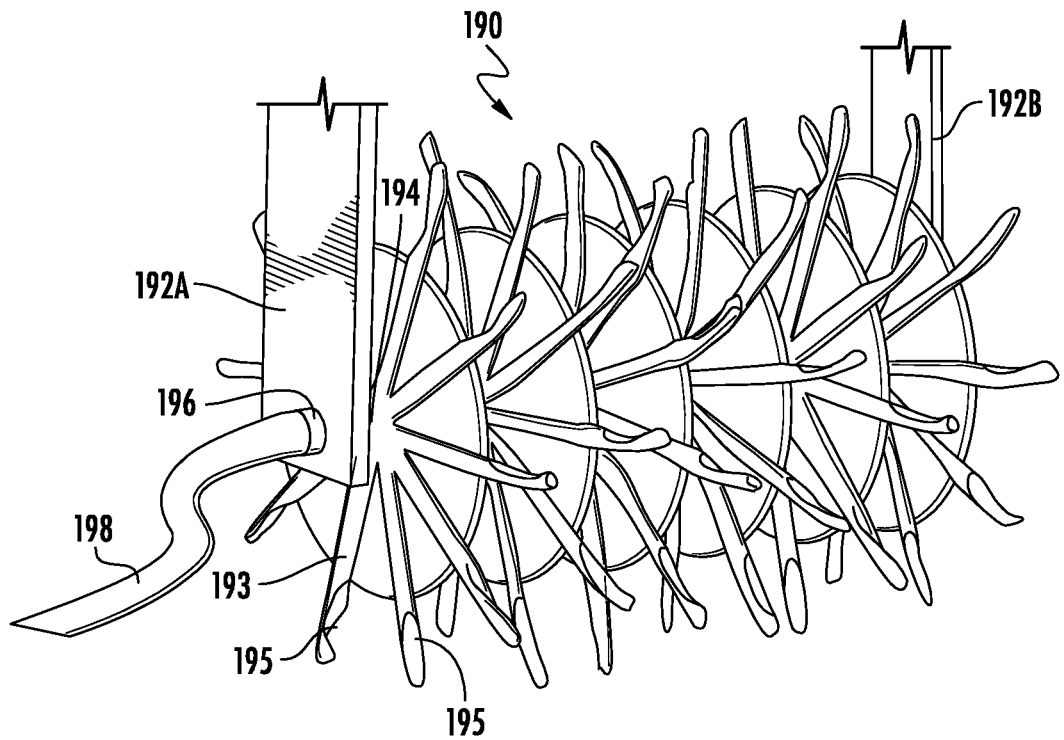
FIG. 12B is a perspective view of the aerator drum of FIG. 12A coupled to a hose.

Referring now to FIGS. 12A-12B, a rolling aerator assembly 190 in accordance with another aspect of the disclosure is shown. Rolling aerator assembly 190 includes a plurality of interconnected drum members 191 having a plurality of tines 193 extending therefrom. The plurality of drum members 191 are shown as being disposed between a pair of arm members 192A, 192B, which may extend below, e.g., a stand-on mower as described below. However, it is to be understood that the rolling aerator assembly 190 may be disposed in any location, such as between a pair of rear drive wheels of a stand-on mower.

As shown in FIGS. 12A-12B, each of the tines 193 are fluidly coupled to one another via a central conduit 194, and each drum member 191 is fluidly coupled to at least one adjacent drum member 191 via its respective central conduit 194. A hose fitting 196 is provided so as to allow for the coupling of a hose 198 to the rolling aerator assembly 190. As shown in FIG. 12B, when hose 198 is coupled to the hose fitting 196 and water is supplied, the water travels through each central conduit 194 and through all tines 193, eventually exiting the tines 193 through openings 195 formed therein. Thus, any dirt or debris build-up within the tines 193 as a result of aeration is expelled by the force of the water travelling through the central conduits 194 and tines 193, thereby providing for a simplified system and method of cleaning a rolling aerator assembly.

Figure 13A:
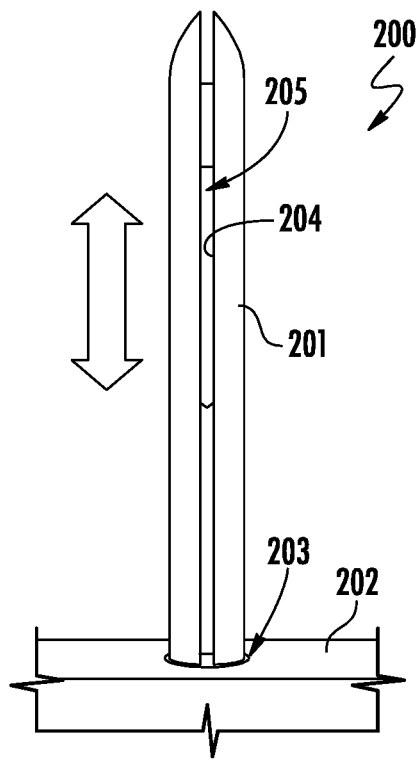
FIG. 13A is a front perspective view of an aerator tine configuration in accordance with an aspect of the disclosure.
Figure 13B:
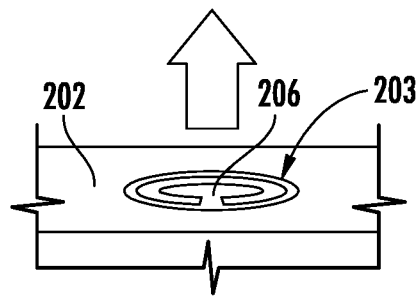
FIG. 13B is a front perspective view of a tine opening on an aerator drum in accordance with an aspect of the disclosure.

Next, referring to FIGS. 13A-13D, a reciprocating tine system 200 in accordance with another aspect of the disclosure is illustrated. As disclosed above, an aerator assembly may include reciprocating tines, which may extend or retract from a drum or other base for various reasons. Reciprocating tine system 200 is configured to provide a self-cleaning tine, wherein the core or plug of soil is automatically expelled as the tine is retracted into the drum or other base. Referring to FIG. 13A, a single tine 201 of reciprocating tine system 200 is shown for the purposes of illustration. However, it is to be understood that a plurality of tines 201 may be utilized. Tine 201 extends from a base 202 (e.g., a rolling drum) through an opening 203 formed in the base 202. The tine 201 includes an elongated slot 204 extending along the length of tine 201, as well as a core opening 205 formed on a side opposite elongated slot 204. As shown in FIG. 13B, the opening 203 includes a gate 206, which prevents the core of soil and other debris from entering the interior of the base 202.

Figure 13C:
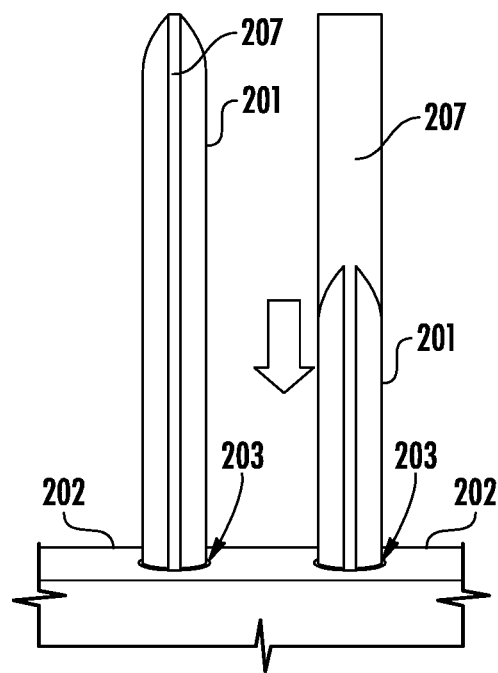
FIG. 13C is a front perspective view of the aerator tine configuration of FIG. 13A having a core being ejected therefrom.
Figure 13D:
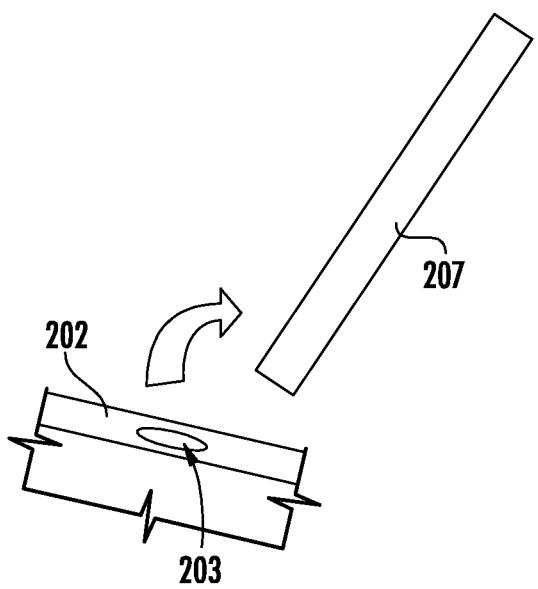
FIG. 13D is a perspective view of an ejected core relative to the aerator drum of FIG. 13A.

Referring now to FIG. 13C, as the tine 201 enters the soil, a core 207 is captures within the interior of the tine 201. Then, as the tine 201 is retracted within the base 202 through opening 203, the core 207 is forced out of the tine 201, where it is then dropped to the ground or another location (FIG. 13D). In this way, the reciprocating tine system 200 allows for easy removal of soil cores and other debris from the tines 201, ensuring that the tines 201 do not become packed with soil, thereby losing their ability to effectively remove soil cores.

Figure 14:
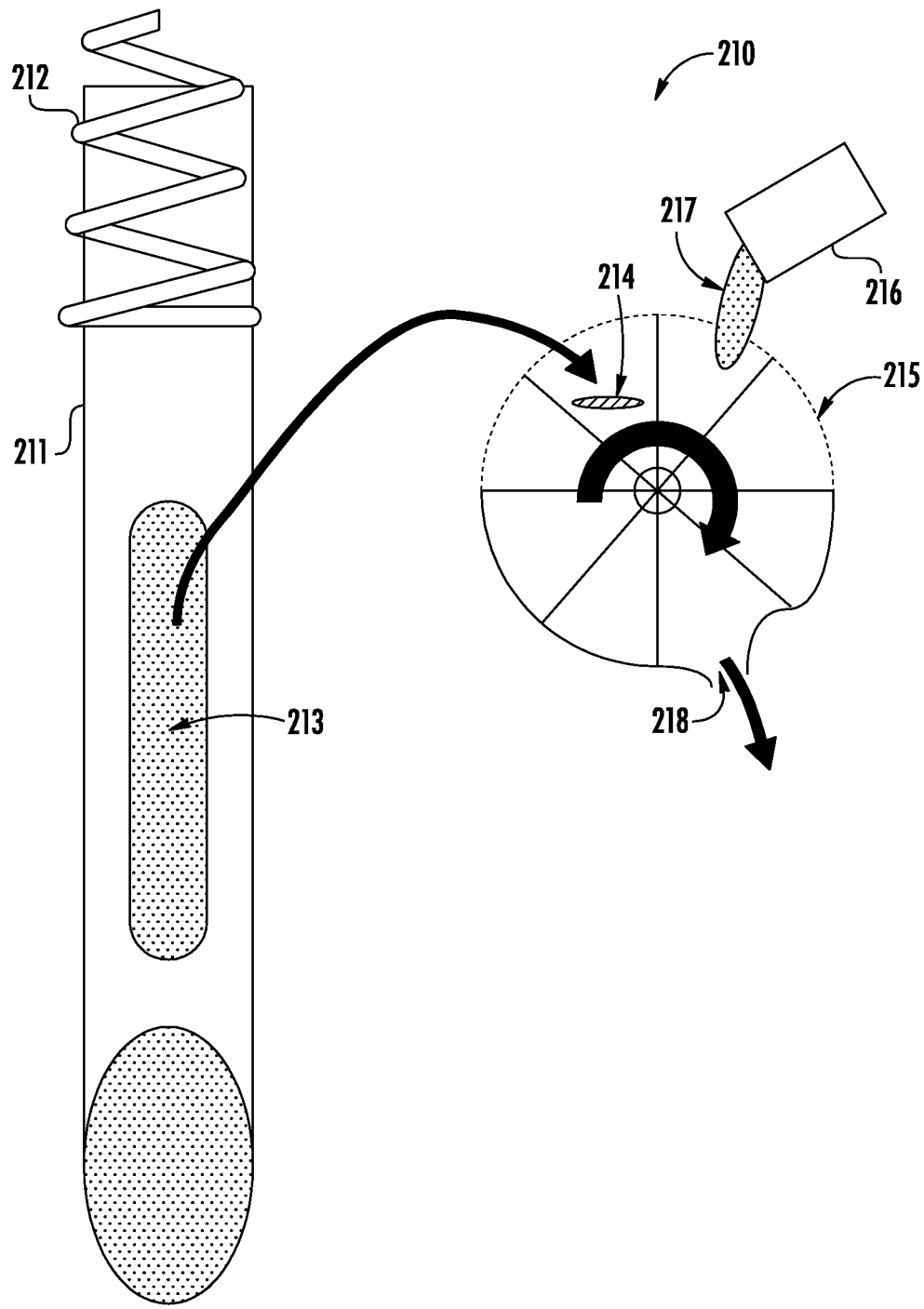
FIG. 14 is a schematic view of an aerator tine, core pulverizing, and seeding assembly in accordance with another aspect of the disclosure.

Finally, referring to FIG. 14, a combined aeration and seeding system 210 in accordance with another aspect of the disclosure is shown. Although only a single tine 211 is shown for the purposes of illustration, it is to be understood that combined aeration and seeding system 210 may include a plurality of tines 211. As described above, the tines 211 may be reciprocating from a drum or other base, with a spring 212 or other mechanism utilized to bias the tine 211 out of the drum or other base. As the tine 211 enters the soil during an aeration procedure, a soil core 214 is removed, and may be removed through an opening 213 formed in the tine 211.

Typically, the soil cores are dropped to the soil surface, either breaking down over time or being manually broken down after the aeration procedure. However, combined aeration and seeding system 210 is configured to capture each soil core 214 to combine the soil with seed and/or fertilizer, thereby recycling the removed soil cores during the aeration procedure. As shown in FIG. 14, the removed soil cores 214 may be captured within a hopper 215, which may pulverize each soil core 214 via, e.g., an auger housed within the hopper 215. The pulverized soil from soil core 214 may be mixed with seed or fertilizer 217 provided by a separate container 216 on board the aerating machine. Then, the combined mixture of soil and seed or fertilizer may be broadcast, spread, or otherwise dropped from the hopper 215 via an opening 218. In this way, the soil cores 214 are not left to degrade on their own, but are instead recycled to provide a nutrient-rich base for seeding and/or fertilizing operations.

While the embodiments discussed above with respect to FIGS. 1A-14 are described generally in conjunction with use on a stand-on aerator configured for zero turn radius maneuverability, it is to be understood that these embodiments may applicable to other aerator configurations, such as walk-on or ride-on aerators. Furthermore, as opposed to having zero turn radius maneuverability, an aerator having the features described herein may be configured to have "spider" maneuverability, capable of moving forward, backward, side-to-side, and/or diagonally without turning. In such a configuration, a grid or array of tines could be provided on the aerator (e.g., a 9×9 grid), thereby allowing for consistent aeration, regardless of direction of travel.

Additionally, with such a configuration, each tine and/or row of tines may be individually controllable, allowing the aerator to travel at a faster speed. That is, if an aerator is equipped with only a single row of reciprocating tines, the travel speed of the aerator must take into account the maximum reciprocating speed of the tines, as travelling too fast or too slow will greatly affect the pattern and density of aeration. However, if multiple rows of reciprocating tines are utilized, the various rows can be operated and controlled independently (i.e., row 1 first, row 2 second, row 3 third), thereby allowing for greater fluctuations in speed without compromising the desired pattern and density of aeration. Additionally, such a configuration allows an operator to set a desired core density for a particular property and/or soil condition, with the reciprocation of the tines being controllable based on drive wheel speed.

Furthermore, as described above, each reciprocating tine may be mechanically, hydraulically, pneumatically, or electrically forced into an extended position using any appropriate means. It is to be further understood that each tine (or a connected subset of tines) may be forced into an extended position by way of a combustible gas (similar to coil roofing nailers), spinning flywheel assemblies, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A stand-on aerator comprising:
   a chassis;
   an operator platform extending from a rear portion of the chassis; and
   an aerator assembly coupled to the chassis, wherein the aerator assembly includes a plurality of reciprocating tines configured to extend from and retract into the aerator assembly; and
   an object detection sensor, wherein at least a portion of the plurality of reciprocating tines are configured to retract in response to the object detection sensor detecting an object in a path of the aerator assembly.

2. The stand-on aerator of claim 1, wherein the portion of the plurality of reciprocating tines that retract in response to the object detection sensor detecting the object comprises all of the plurality of reciprocating tines.

3. The stand-on aerator of claim 1, wherein the portion of the plurality of reciprocating tines that retract in response to the object detection sensor detecting the object comprises a first subset of the plurality of reciprocating tines that are in the path of the object.

4. The stand-on aerator of claim 3, wherein a second subset of the plurality of reciprocating tines remain extended.

5. The stand-on aerator of claim 1, wherein the plurality of reciprocating tines are configured to be electrically actuated, and are coupled to at least one spring-biasing member and at least one electric motor.

6. The stand-on aerator of claim 5, wherein the at least one spring-biasing member is configured to force the plurality of reciprocating tines to extend from the aerator assembly, and wherein the at least one electric motor is configured to overcome a force of the at least one spring-biasing member to retract the plurality of reciprocating tines into the aerator assembly.

7. The stand-on aerator of claim 1, wherein the aerator assembly is configured as a rolling drum aerator having the plurality of reciprocating tines disposed circumferentially about a rolling drum so that the plurality of reciprocating tines extend and retract radially.

8. A stand-on aerator comprising:
   a chassis;
   an operator platform extending from a rear portion of the chassis; and
   an aerator assembly coupled to the chassis, wherein the aerator assembly includes a plurality of reciprocating tines configured to extend from and retract into the aerator assembly; and
   an object detection sensor positioned to detect an object in a path the plurality of reciprocating tines, wherein the plurality of reciprocating tines are configured to retract into the aerator assembly in response to the object detection sensor detecting the object in the path of the plurality of reciprocating tines.

9. The stand-on aerator of claim 8, wherein the plurality of reciprocating tines are configured to be electrically actuated, and are coupled to at least one spring-biasing member and at least one electric motor.

10. The stand-on aerator of claim 9, wherein the at least one spring-biasing member is configured to force the plurality of reciprocating tines to extend from the aerator assembly, and wherein the at least one electric motor is configured to overcome a force of the at least one spring-biasing member to retract the plurality of reciprocating tines into the aerator assembly.

11. The stand-on aerator of claim 8, wherein the aerator assembly is configured as a rolling drum aerator having the plurality of reciprocating tines disposed circumferentially about a rolling drum so that the plurality of reciprocating tines extend and retract radially.

12. The stand-on aerator of claim 11, wherein the aerator assembly includes a rolling drum member that is rotatable relative to the chassis.

13. A stand-on aerator comprising:
   a chassis;
   an operator platform extending from a rear portion of the chassis; and
   an aerator assembly coupled to the chassis, wherein the aerator assembly includes a plurality of reciprocating tines configured to extend from and retract into the aerator assembly; and
   an object detection sensor, wherein when the object detection sensor detects an object in a path of the aerator assembly, the aerator assembly is configured to retract a first subset of the plurality of reciprocating tines that are in the path of the object.

14. The stand-on aerator of claim 13, wherein a second subset of the plurality of reciprocating tines remain extended.

15. The stand-on aerator of claim 14, wherein the second subset of the plurality of reciprocating tines avoid the path of the object.

16. The stand-on aerator of claim 13, wherein the plurality of reciprocating tines are configured to be electrically actuated, and are coupled to at least one spring-biasing member and at least one electric motor.

17. The stand-on aerator of claim 16, wherein the at least one spring-biasing member is configured to force the plurality of reciprocating tines to extend from the aerator assembly, and wherein the at least one electric motor is configured to overcome a force of the at least one spring-biasing member to retract the plurality of reciprocating tines into the aerator assembly.

18. The stand-on aerator of claim 13, wherein the aerator assembly is configured as a rolling drum aerator having the plurality of reciprocating tines disposed circumferentially about a rolling drum so that the plurality of reciprocating tines extend and retract radially.

19. The stand-on aerator of claim 18, wherein the aerator assembly includes a rolling drum member that is rotatable relative to the chassis.

20. The stand-on aerator of claim 19, wherein the rolling drum member is a fixed distance from the chassis.

\* \* \* \* \*